May 15, 1956 H. PIKAL 2,745,374
MACHINE FOR COATING APPLES ON STICKS
Filed March 13, 1952 2 Sheets-Sheet 1
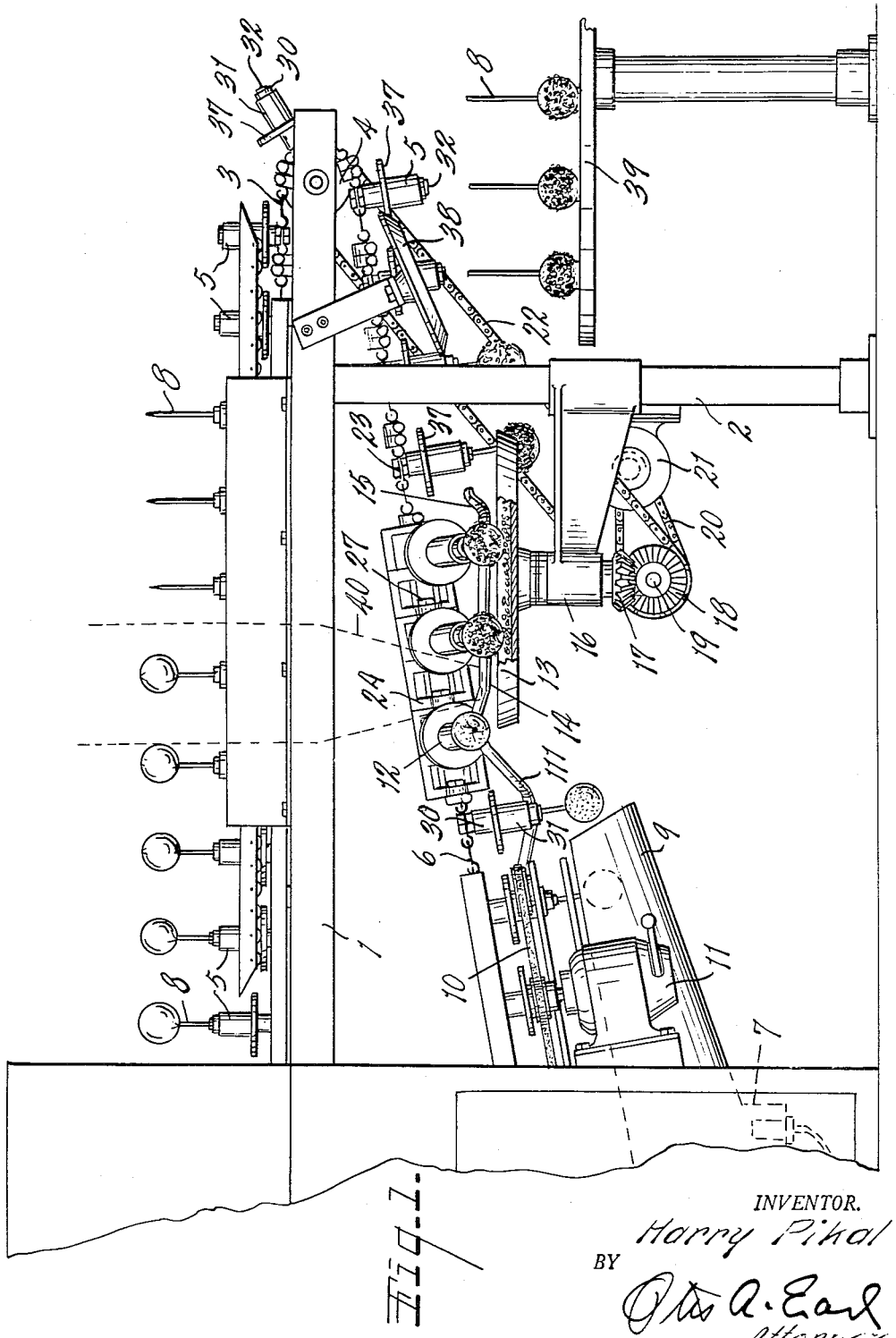
INVENTOR.
Harry Pikal
BY
Otis A. Earl
Attorney May 15, 1956  H. PIKAL  2,745,374
MACHINE FOR COATING APPLES ON STICKS
Filed March 13, 1952  2 Sheets-Sheet 2
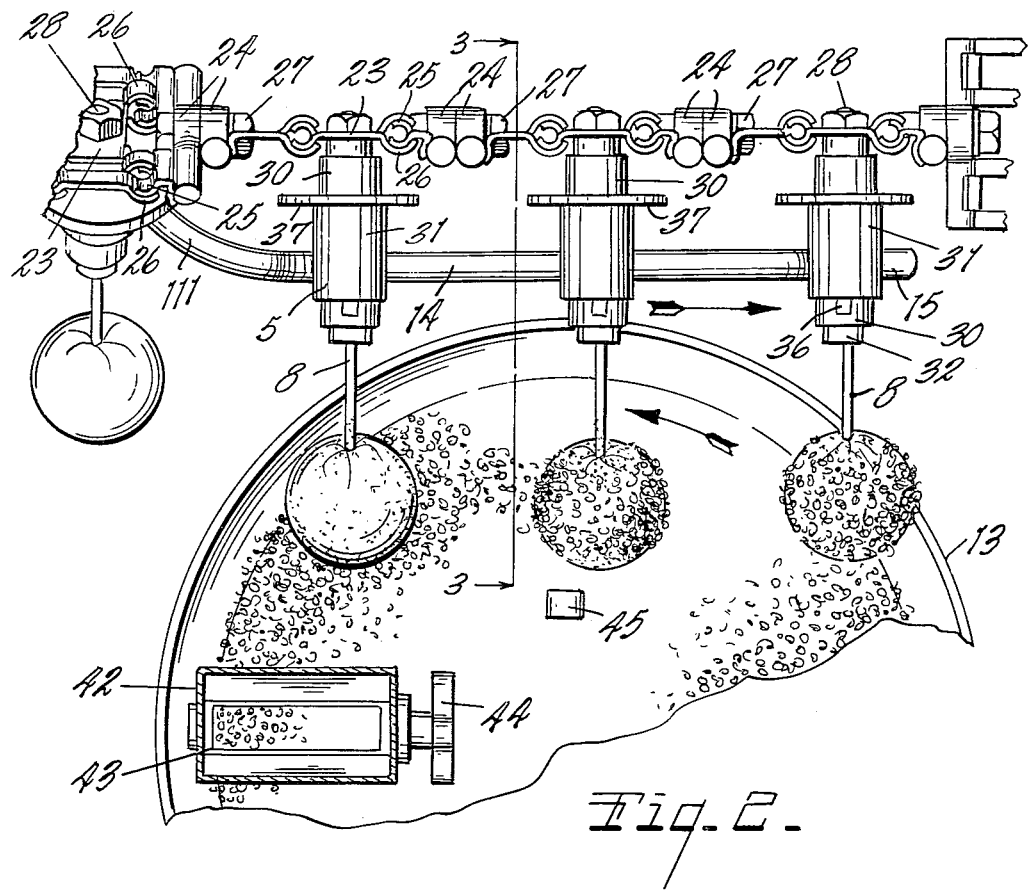
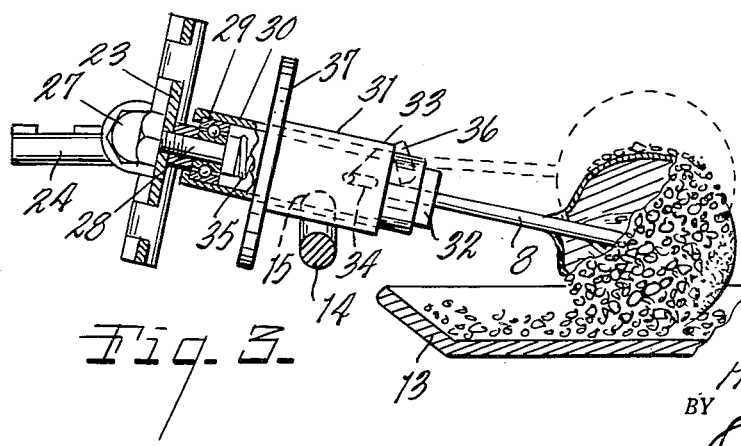
INVENTOR.
Harry Pikal
BY
ATTORNEY United States Patent Office 2,745,374
Patented May 15, 1956

2,745,374

MACHINE FOR COATING APPLES ON STICKS

Harry Pikal, Bangor, Mich.

Application March 13, 1952, Serial No. 276,379

6 Claims. (Cl. 118—16)

This invention relates to improvements in a machine for coating apples on sticks.

The subject matter of this application has been in part divided from my co-pending application, Serial No. 44,553, filed August 16, 1948, for Coating Machine for Apples and the Like, now abandoned.

The principal objects of this invention are:

First, to provide a machine which will automatically coat apples with a coating of caramel or other sticky confection and thereafter apply a layer of a comminuted comestible such as crushed nuts.

Second, to provide a machine which will remove excess confection coating from a freshly coated apple and immediately thereafter subject the apple and the coating to a supply of comminuted comestible to cause the comestible to adhere to the coating while it is still in sticky condition and well adapted to receive the comestible.

Third, to provide an apple coating machine which will translate apples on sticks through a heated dip bath of caramel and immediately spin off excess caramel and thereafter quickly deposit the apples in a rolling position on a table covered with comminuted comestibles such as crushed nuts so that the apples are rolled across the layer of nuts while the caramel coating is still in sticky condition.

Other objects and advantages of my invention will be apparent from a consideration of the following description and claims.

The drawings of which there are two sheets illustrate a highly practical form of my apple coating machine.

Fig. 1 is a fragmentary side elevational view of my coating machine, portions of the machine being broken away in vertical cross-section.

Fig. 2 is a fragmentary plan view of the portion of my machine which applies the coating of comminuted comestible to the previously dipped apples.

Fig. 3 is a fragmentary transverse cross-sectional view through the apple advancing conveyor and the coating table taken along the plane of the line 3—3 in Fig. 2.

Caramel coated apples on sticks are a familiar type of confection but previous to my invention originally disclosed in the above referred to application these apples were uniformly prepared by hand by dipping the apples into a bath of heated caramel or other confection and thereafter permitting the excess caramel to drain from the apple. Sometimes an outer coating of fresh nuts was applied to the caramel coated apple but this operation was also performed by hand. The problem of automatically applying a caramel layer and a second coating of crushed nuts to apples on sticks is complicated by the fact that the temperature of the caramel must be maintained high enough to keep the caramel in liquid condition and still not too high so as to injure the fruit. The problem is further complicated by the fact that the caramel layer thus applied quickly loses its sticky adhesive character as it cools and it is therefore difficult to make a second coating of nut meats or other comestible stick to the layer of caramel. My machine moves the apple quickly through the dipping process and to the secondary coating step so that the caramel layer is still in a satisfactory condition to receive and to hold the comminuted comestible.

In the drawings I have illustrated a highly practical form of my machine which includes suitable framework structure 1 and supports 2. The framework carries a continuous conveyor generally indicated at 3 which is trained around a sprocket 4 at one end of the machine and other sprockets not illustrated at the other end of the machine. The conveyor is arranged to travel in a closed circuit in the direction indicated by the arrows and is provided at intervals along its length with a plurality of stick receiving chucks 5 that project upwardly from the closed circuit of the conveyor. The lower reach of the conveyor indicated at 6 is inclined upwardly from a low point and a suitable dip tank indicated generally at 7 is provided for holding a bath of liquid heated caramel in the path of apples impaled on the ends of sticks 8 received in the chucks 5. Upwardly along the lower reach 6 of the conveyor the tank 7 is provided with an inclined trough extension 9 through which the apples are translated. The chucks 5 are individually rotatable about their projecting axes as will be more particularly described later and I provide a belt 10 driven by a motor 11 and positioned along side the path of the chucks as the apples are translated through the trough 9 to rapidly spin the chucks and the apples to throw off excess caramel into the trough 9.

Immediately after leaving the spinning belt 10 the chucks 5 are engaged by a curved guide rail 111 that extends transversely across the path of the conveyor and upwardly to elevate each successive chuck and apple laterally of the conveyor as is indicated at 12. The elevated apple is then carried across the rim of a circular table 13 that is rotatably mounted below and to one side of the conveyor. The apples are permitted to descend and rest upon one side of the table by a lowered portion 14 of the guide rail and due to the rotatable character of the chucks 5 the apples will roll across the surface of the table as they are advanced longitudinally by the conveyor 3. After passing the table 13 the chucks and apples are again elevated by a raised portion 15 in the guide rail to clear the rim of the table. The chucks and apples are then permitted to fall downwardly underneath the lower reach 6 of the conveyor.

The table 13 is rotatably supported on a bracket 16 secured to the support 2 and is provided with a bevel gear 17 drivingly engaged with a second bevel gear 18 on the shaft 19. The shaft 19 carries a sprocket which is chain driven by the chain 20 from a motor 21 or other suitable driving means. The shaft 19 is further provided with a sprocket drivingly connected by the chain 22 with the sprocket 4 for simultaneously driving the conveyor 3.

Considering the construction of the conveyor 3 in greater detail attention is directed to Fig. 2 wherein it will be noted that the conveyor consists of a series of links 23 having the chucks 5 mounted thereon. Connecting links 24 on each end of the links 23 have oppositely facing arcuate flanges 25 formed thereon and telescopically received in arcuate flanges 26 on the ends of the links 23. These flanges form transversely extending knuckle joints so that the conveyor 3 is flexible and will bend longitudinally of its length in passing around its closed circuit. Two of the connecting links 24 are connected in back-to-back relation by means of a longitudinally extending pivot bolt 27 so that the conveyor is also twistable about its longitudinal axis. The transverse twisting of the conveyor permits the lateral swinging motion of the chucks and apples when moved by the guide rail 111 as previously described. Other forms of conveyor structure may be provided as it is transversely or laterally swingable character of the chucks that is important to the functioning of my machine.

The construction of the chucks 5 is more particularly illustrated in Fig. 3. As is shown therein the links 23 carry a projecting bolt 28 on which is mounted a ball bearing 29. The other rotatable part of the bearing 29 carries a tubular body 30 on which an outer sleeve 31 is slidably mounted. An interior chuck 32 is mounted to slide within the body 30 and is connected to the sleeve 31 by means of a pin 33 passing through slots 34 in the sides of the body 30. A spring 35 bears against the bearing 29 and constantly urges the chuck 32 outwardly. The chuck has a stick receiving hole formed in its other end and carries a pivoted jaw 36 that extends through the side of the body 30 to be engaged by the sleeve 31. As the chuck 32 and sleeve 31 are urged outwardly by the spring 35 the outer end of the jaw 36 engages the outer end of the tubular body 30 and moves the jaw to stick gripping position. Inward retraction of the sleeve 31 and the chuck 32 moves the jaw 36 inwardly and against the inner end of a slot in the body 30 to release the jaw. Desirably the sleeve 31 is provided with a flat annular collar 37 that is engaged by a releasing disc 38 mounted near the upper end of the lower reach of the conveyor as shown in Fig. 1 to automatically release the sticks and permit the coated apple to fall to a receiving table 39. The construction of the chuck can also be varied considerably from the particular embodiment illustrated as it is the laterally swingable and individually rotatable character of the chuck which is important to the operation of my machine.

The crushed nuts or other comminuted comestibles may be supplied to the rotating table 13 by hand or they may be conveniently and automatically distributed upon the table by means of a supply hopper 40 mounted on the framework 1 and having a delivery mouth 42 positioned over the table 13. The flow of nuts is controlled by a rotatable valve 43 having a star wheel 44 connected to one end thereof. The table 13 may be provided with one or more lugs 45 positioned to engage and rotate the star wheel 44 and valve 43 as the table rotates.

Attention is directed to the fact that the table 13 desirably rotates oppositely to the direction of movement of the apples with the chucks as is illustrated in Fig. 2. This facilitates the rolling motion of the apples as they travel across the table and causes the crushed nuts to pile up slightly in front of the apples so that the apples are well coated. It is pointed out that the inclined position of the conveyor reach 6 where it passes along the table 13 causes the apples to be tilted as they move across the table so that the apples are well coated and the nuts are not applied around a single circumference of the apples only. I have thus described a highly practical form of my apple coating machine so that others may reproduce and use the same without further disclosure. However, the disclosure is to be considered only as an example of my invention and not as a limitation of the invention as defined in the following claims.

Having thus described my invention, what I claim as new and desire to secure by Letters Patent is:

1. A machine for coating apples on sticks comprising a supporting framework having a continuous conveyor mounted thereon for movement in closed circuit between two upright planes, said conveyor comprising pivotally connected relatively movable elements, some adjacent pairs of said elements being relatively twistable angularly about the line of motion of the conveyor, stick receiving chucks mounted on certain of said elements and having their chucking axes projecting outwardly of the circuit of the conveyor, said chucks being mounted for individual free rotation about their projecting axes and having exposed cylindrical surfaces, said conveyor having a lower reach advancing upwardly from a low point, tank means positioned adjacent the low point for immersing apples on the ends of sticks mounted in said chucks in a heated sticky confection, means positioned upwardly along the lower reach and over a portion of said tank means and adapted to engage said cylindrical surfaces and spin said chucks in depending vertical position to throw off excess confection from said apples into said tank means, a guide rail positioned upwardly along said lower reach from said spinning means and in the path of said chucks, said rail being curved to swing said chucks laterally of said conveyor, a horizontal circular table having one side positioned in closely spaced relationship from the end of said spinning means and under an upper portion of said rail, said rail having a downwardly curved portion adapted to permit lowering of the laterally displaced apples onto said table and a rising portion adapted to lift apples off of the far edge of the table as the apples are advanced thereacross, means for delivering a comminuted comestible to said table to provide a layer of the comestible on the table, means connected to drive said conveyor, and means connected to rotate said table with the portion of the table in the path of the apples moving oppositely to the adjacent portion of the conveyor.

2. A machine for coating apples on sticks comprising a supporting framework having a continuous conveyor mounted thereon for movement in closed circuit between two upright planes, said conveyor comprising pivotally connected relatively movable elements, some adjacent pairs of said elements being relatively twistable angularly about the line of motion of the conveyor, stick receiving chucks mounted on certain of said elements and having their chucking axes projecting outwardly of the circuit of the conveyor, said chucks being mounted for individual free rotation about their projecting axes and having exposed cylindrical surfaces, said conveyor having a lower reach advancing upwardly from a low point, tank means positioned adjacent the low point for immersing apples on the ends of sticks mounted in said chucks in a heated sticky confection, means positioned upwardly along the lower reach and closely adjacent said tank means and adapted to engage said cylindrical surfaces and spin said chucks in depending vertical position to throw off excess confection from said apples, a guide rail positioned upwardly along said lower reach from said spinning means and in the path of said chucks, said rail being curved to swing said chucks laterally of said conveyor, a horizontal table having one side positioned in closely spaced relationship from the end of said spinning means and under an upper portion of said rail, said rail having a portion adapted to permit lowering of the laterally displaced apples onto said table, means for delivering a comminuted comestible to said table to provide a layer of the comestible on the table, means connected to drive said conveyor, and means connected to rotate said table with the portion of the table in the path of the apples moving oppositely to the adjacent portion of the conveyor.

3. A machine for coating apples on sticks comprising a supporting framework having a continuous conveyor mounted thereon for movement in closed circuit, said conveyor comprising pivotally connected relatively movable elements, chuck support members mounted on some of said elements and being relatively twistable angularly about the line of motion of the conveyor, stick receiving chucks freely rotatably mounted on said support members and having their chucking axes projecting outwardly of the circuit of the conveyor, said chucks being mounted for rotation about their projecting axes and having exposed cylindrical surfaces, tank means positioned adjacent one reach of said conveyor for immersing apples on the ends of sticks mounted in said chucks in a heated sticky confection with the chucks depending from the conveyor, means positioned further along said reach and adapted to engage said cylindrical surfaces and spin said chucks in depending vertical position to throw off excess confection from said apples, a guide rail positioned still further along said reach from said spinning means and in the path of said chucks, said rail being curved to swing said chucks laterally of said conveyor, a horizontal table having one side positioned in closely spaced relationship from the end of said spinning means, said rail having a portion adapted to permit positioning of the laterally displaced apples onto said table, means for delivering a comminuted comestible to said table to provide a layer of the comestible on the table, means connected to drive said conveyor, and means connected to rotate said table with the portion of the table in the path of the apples moving oppositely to the adjacent portion of the conveyor.

4. A machine for coating whole fresh fruits on sticks comprising a supporting framework having a work advancing member mounted thereon for movement in a closed circuit, chuck support elements pivotally mounted at intervals along said member for tilting motion laterally of the path of movement of the elements, stick receiving chucks rotatably mounted on said elements for free rotation about their chucking axes and projecting from said member along their chucking axes, a dip tank positioned under a portion of the path of movement of said chucks to immerse apples on the ends of sticks held in said chucks and depending from said member in a heated sticky confection in melted liquid form, exposed cylindrical surfaces on said chucks, means engageable with said surfaces closely adjacent the point of exit of said chucks from said tank to spin the chucks and apples to throw off excess confection, a guide rail positioned adjacent said member in the path of chucks leaving said spinning means, said rail being disposed to swing said chucks to laterally extending position while the confection coating on apples carried by the chucks is still sticky, a round platform rotatably movably positioned to receive and support apples carried by the laterally extending chucks, means for delivering a layer of comminuted comestible to said platform in the path of apples advanced by said chucks, means for driving said advancing member to advance said chucks, and means to move said movable platform in a direction opposite to the direction of movement of the apples engaged therewith.

5. A machine for coating whole fresh fruits on sticks comprising a supporting framework having a work advancing member mounted thereon for movement in a closed circuit, chuck support elements pivotally mounted at intervals along said member for tilting motion laterally of the path of movement of the elements, stick receiving chucks rotatably mounted on said elements for free rotation about their chucking axes and projecting from said members along their chucking axes, means positioned along a portion of the path of movement of said chucks to apply a coating of sticky melted confection on apples on the ends of sticks held in said chucks, exposed cylindrical surfaces on said chucks, means engageable with said surfaces closely following the point of exit of said chucks from coating means to spin the chucks and apples to throw off excess confection, a guide rail positioned adjacent said member in the path of chucks leaving said spinning means, said rail being disposed to swing said chucks to laterally extending position while the confection coating on apples carried by the chucks is still sticky, a round platform rotatably movably positioned to receive and support apples carried by the laterally extending chucks, means for delivering a layer of comminuted comestible to said platform in the path of apples advanced by said chucks, means for driving said advancing member to advance said chucks, and means to move said movable platform in a direction opposite to the direction of movement of the apples engaged therewith.

6. A machine for coating whole fresh fruits on sticks comprising a supporting framework having a work advancing member mounted thereon for movement in a closed circuit, chuck support elements pivotally mounted at intervals along said member for tilting motion laterally of the path of movement of the elements, stick receiving chucks rotatably mounted on said elements for free rotation about their chucking axes and projecting from said members along their chucking axes, means positioned along a portion of the path of movement of said chucks to apply a coating of sticky melted confection on apples on the ends of sticks held in said chucks, exposed cylindrical surfaces on said chucks, means engageable with said surfaces closely following the point of exit of said chucks from coating means to spin the chucks and apples to throw off excess confection, a guide rail positioned adjacent said member in the path of chucks leaving said spinning means, said rail being disposed to swing said chucks to laterally extending position while the confection coating on apples carried by the chucks is still sticky, a platform movably positioned to receive and support apples carried by the laterally extending chucks, means for delivering a layer of comminuted comestible to said platform in the path of apples advanced by said chucks, means for driving said advancing member to advance said chucks, and means to move said movable platform in a direction opposite to the direction of movement of the apples engaged therewith.

References Cited in the file of this patent
UNITED STATES PATENTS

| Number | Name | Date |
|---|---|---|
| 1,166,071 | Mettler | Dec. 28, 1915 |
| 1,574,430 | Lemon | Feb. 23, 1926 |
| 1,647,594 | Weaver et al. | Nov. 1, 1927 |
| 1,686,174 | Rauschenberger | Oct. 2, 1928 |
| 2,076,451 | Fallscheer | Apr. 6, 1937 |
| 2,155,995 | Robb | Apr. 25, 1939 |
| 2,335,118 | Hauser et al. | Nov. 23, 1943 |
| 2,339,437 | Taylor | Jan. 18, 1944 |
| 2,347,164 | Petrilli | Apr. 18, 1944 |
| 2,503,803 | Cremer et al. | Apr. 11, 1950 |
| 2,560,270 | Bird | July 10, 1951 |
| 2,572,773 | Slagle | Oct. 23, 1951 |
| 2,639,799 | Pikal | May 26, 1953 |